Nov. 1, 1938.                E. K. RALSTON                2,134,840
                             WATER SEPARATOR
                           Filed June 25, 1936
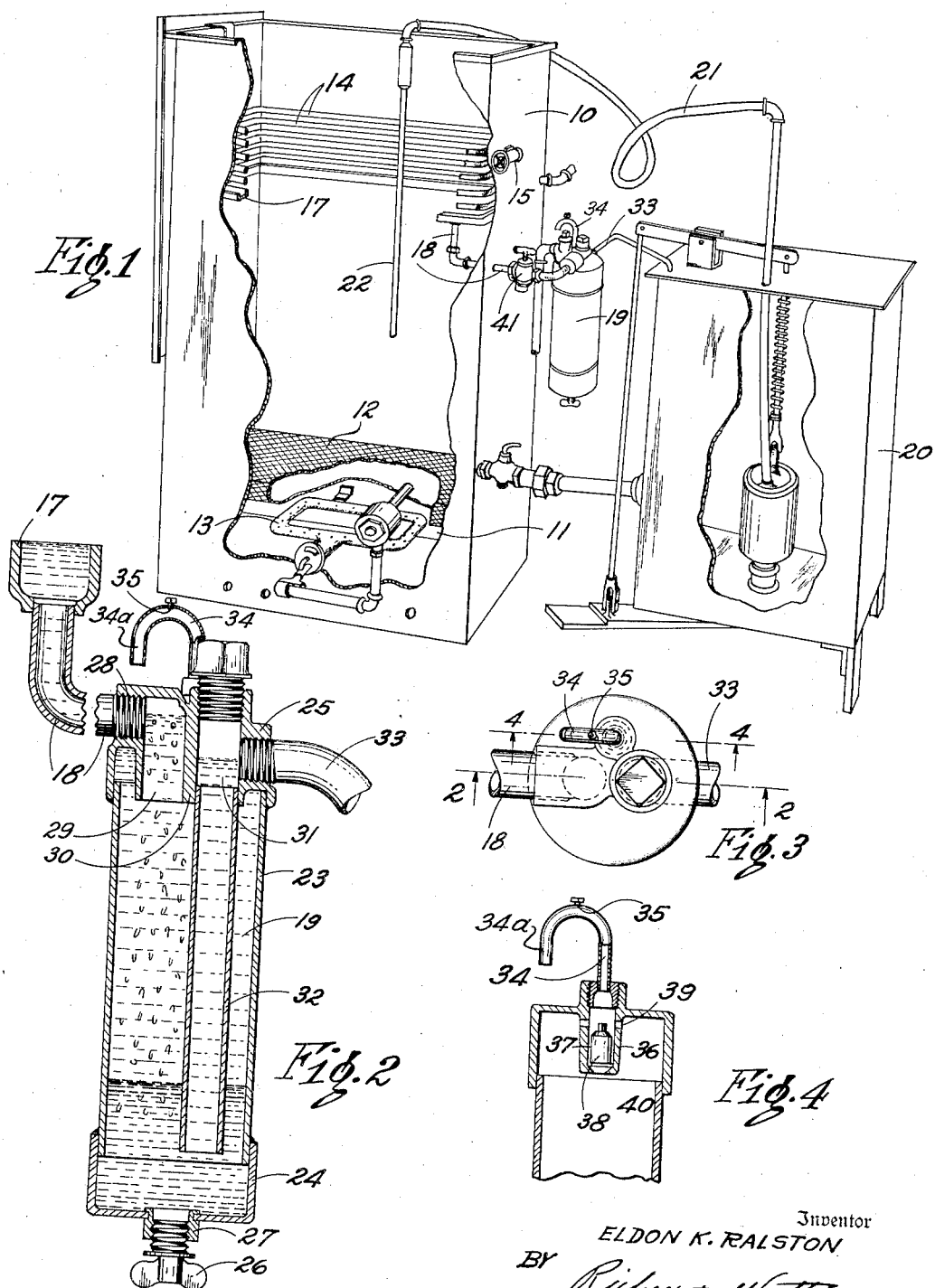
Inventor
ELDON K. RALSTON
BY Risley & Watts
Attorneys Patented Nov. 1, 1938

2,134,840

UNITED STATES PATENT OFFICE 2,134,840

WATER SEPARATOR

Eldon K. Ralston, Cleveland, Ohio, assignor to Circo Products Company, Cleveland, Ohio, a corporation of Ohio Application June 25, 1936, Serial No. 87,232

2 Claims. (Cl. 210—54)

This inventon relates broadly to grease removal plants and more specifically to apparatus for separating water from the solvents employed therein.

In grease removal apparatus of the type in which the cleaning medium comprises a vaporized chlorinated hydrocarbon solvent it has been found necessary to stabilize the solvent in order to prevent the deterioration thereof. For example, carbon tetrachloride, trichlorethylene, dichlorethylene and certain other solvents now commonly in use are subject to decomposition under the influence of ultra violet light, contact with certain metals, acids and water etc. As decomposition of the solvent occurs chlorene is liberated which, when united with the water constituent of the condensated vapors in the tank, forms hydrochloric acid. This condition is highly undesirable since hydrochloric acid causes rusting of the unprotected parts of the apparatus, the work being cleaned and rapid corrosion of metallic bodies within the environs of the degreasing plant.

It has been found that distillation destroys a large percentage of certain stabilizers and since the solvent is distilled over and over again during the operation of the apparatus contemplated herein the problem of maintaining the quality of the solvent is readily apparent.

The object of the present invention, therefore, is to obviate the deleterious effects of the hydrochloric acid to eliminate the decomposition and dilution of the solvent and to provide a bath or chemical solution through which the solvent may be filtered in order to neutralize any acid contamination thereof.

Another object of the invention is to provide a water separator for the purpose heretofore described, which is simple of structure, economic of manufacture and dependable of operation.

Other objects more or less ancillary to the foregoing and the manner in which all the various objects are realized will appear in the following description which, considered in connection with the accompanying drawing, sets forth the preferred embodiment of the invention.

Referring to the drawing wherein the improved water separator is illustrated as coordinated with a degreasing unit of the type heretofore described;

Figure 1 is a view in perspective of a degreasing plant, certain portions thereof being broken away to illustrate the arrangement of the structural features thereof;

Fig 2. is a vertical section taken on the line 2—2 of Fig. 3;

Fig. 3 is a plan view of the device shown in Fig. 2; and

Fig. 4 is a vertical section taken on the plane indicated by the line 4—4 in Fig. 3.

As illustrated in Fig. 1 the degreasing apparatus comprises a tank or cabinet 10 having a solvent reservoir 11 adjacent the base thereof, preferably provided with a screen or grill covering 12. As shown, a gas burner 13 beneath the reservoir 11 is provided for heating the solvent. However, other forms of heating elements such as an electric resistance coil or steam pipe may be employed if desired. In the upper portion of the tank there is a series of coils 14 connected through couplings 15 to a water main to provide a cooling medium for expediting condensation of the vapors expelled from the heated solvent in the reservoir 11. Beneath the condensing coil 14 there is a trough or gutter 17 disposed to receive the products of condensation and convey the same to the conduit 18 and in turn to the water separator 19.

As illustrated herein, though not necessarily an essential part of the degreasing unit, there is a solvent storage tank and pump unit 20 disposed adjacent the cleaning chamber 10. The storage tank and pump 20 may be of any conventional form and is preferably provided with a flexible conduit 21 and flushing nozzle 22 for use when necessary to apply a vigorous application of the cleansing fluid to the work.

The water separator 19 as illustrated in Fig. 2 embodies a housing 23 preferably of cylindrical form having base and cap members 24 and 25 respectively affixed thereto. The base is provided with a clean out plug 26 which as illustrated may be screw threaded into a nipple 27 secured in the lower portion of the base member. The cap 25 is formed with an opening 28 for the reception of the conduit 18, and communicating with the opening 28 there is a passage 29 in a depending boss 30, the passage 29 being arranged for fluid communication with the chamber 23. Within the boss 30 and adjacent the passage 29 there is a discharge opening 31 having a depending tube 32 therein which terminates in the lower portion of the chamber adjacent the base thereof. The discharge opening 31 is in fluid communication with a solvent return conduit 33 which as illustrated in Fig. 1 may terminate within the tank 20 or if desired lead back to the degreasing cabinet 10. The cap 25 is constructed with a water overflow conduit 34 which embodies an air vent 35 and a depending portion or soil pipe 34a. Beneath the overflow 34 and coordinated therewith there is a valve 36 which comprises a cylindrical body 37 having a float 38 mounted for free reciprocative movement therein. The float is constructed from a material such as Bakelite which is of suitable buoyancy to float in the solvent employed in the degreasing apparatus but will not float in water or the solution in the top of the cylinder 19. The upper portion of the valve chamber 37 is provided with openings 39 disposed to permit the water to flow from the top of the container and be discharged through the conduit or waste pipe 34, while an opening 40 in the base thereof is provided to permit entry of fluid to the interior of the valve chamber 37 to effect operation of the float and closure of the line 34 in the event the discharge line 33 should become clogged and the cylinder 19 completely filled with the solvent.

In operation as the solvent is condensed water which is liberated from the cold metallic parts immersed in the vapor bath or extant through any other medium, combines with the condensed solvent and is collected in the trough 17 from whence it is conveyed through the conduit 18 to the water separator 19. As this mixture enters the chamber 19 the velocity thereof decreases as it commingles with the fluid in the chamber and spheroidal particles of the solvent are formed which settle to the bottom of the chamber 19 while the water constituent of the fluid gradually rises to the top of the container. In order to promote the separation of the water and solvent an alkaline solution or any suitable acid neutralizing and/or absorbing agent is fed into the separator before or during the operation of the apparatus as required. The use of such solution also serves to neutralize any of the acids absorbed by the solvent during the degreasing operation. When trichlorethylene, carbon tetrachloride, dichlorethylene or other chlorinated solvents are employed the solvent filtering through the alkaline solution will be freed of the acid compounds therein. After the solvent settles upon the bottom of the container 19 it will pass through the tube 32 and discharge line 33, which, as illustrated, is disposed slightly below the water outlet 34 and intake conduit 18. As the products of condensation from the conduit 18 reach the chamber 19 the water therein, being lighter than the solvent, will rise to the top of the chamber and commix with the alkaline solution, the excess thereof being expelled through the waste pipe or water overflow conduit 34.

Thus the solvent discharge opening is located below the intake orifice a sufficient amount to cause the weight of the column of water and alkaline solution to effect the discharge of the solvent through the outlet 33.

As illustrated in Fig. 2 the position of the water overflow conduit 34 is arranged upon the same level or slightly below the bottom of the trough 17, thus drainage of all of the products of condensation from the apparatus and separation of water from the entire condensate is assured.

The respective discharge openings are constructed proportional to the ratio of the height of the columns of the solvent and water or inversely proportional to their densities.

As shown in Fig. 1, a valve 41 is provided in the conduit 18 to arrest the flow of fluid therethrough should it be desired to repair, adjust or clean any of the parts of the separator during operation of the apparatus.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A water separator for the condensate of a vaporous solvent in a degreasing plant of the class described comprising, a closed ended cylinder having an alkaline solution therein, an inlet conduit in fluid communication with the degreasing plant and the upper portion of said cylinder, a tube in said cylinder depending from the upper portion thereof and terminating adjacent the bottom of the cylinder, an outlet conduit in fluid communication with the upper portion of said tube and connected with said degreasing plant for the return of the portion of the condensate which settles at the bottom of said cylinder, a waste pipe in said cylinder superjacent said outlet conduit, a valve in the mouth of said waste pipe, a float therein adapted to open and close communication to said pipe, said float being made of a material which is buoyant in said condensate but not buoyant in water whereby egress of the portion of the condensate from which the water is divided will be restrained through said valve.

2. A water separator for the condensate of a vaporous solvent in a degreasing plant of the class described comprising, a closed ended cylinder having an alkaline solution therein, an inlet conduit in fluid communication with the degreasing plant and the upper portion of said cylinder, an outlet tube in said cylinder depending from the upper portion thereof and terminating adjacent the bottom of the cylinder, said outlet tube being connected with said degreasing plant for the return of the portion of the condensate which settles at the bottom of the cylinder, a valve in the top of said cylinder, a waste pipe connected thereto, said valve comprising a chamber having an opening therein for the admission of fluid from said cylinder, a float in said valve chamber formed of a material which is buoyant in said condensate but not buoyant in water and formed to close said waste pipe when elevated, whereby egress of the condensate is restrained through said valve.

ELDON K. RALSTON.